July 20, 1943.    B. H. SHINN    2,324,999

GRAVITY OPERABLE VALVE

Filed Feb. 5, 1942

Inventor

BYRON H. SHINN

By

Attorneys

Patented July 20, 1943

2,324,999

UNITED STATES PATENT OFFICE 2,324,999

GRAVITY OPERABLE VALVE

Byron H. Shinn, Butler, Pa., assignor to The Firestone Tire & Rubber Company, Akron, Ohio, a corporation of Ohio Application February 5, 1942, Serial No. 429,701

2 Claims. (Cl. 220—44)

This invention relates to improvements in gravity operable valves.

It is a primary object of this invention to provide a simple and low cost gravity operable valve particularly adapted for use with a closure cap for liquid containing vessels such as are employed to store reserve liquid in hydraulic airplane brake systems.

Another object is to provide a closure cap with a tip-over valve which will remain open and allow fluid and air passage therethrough when the cap is in one position, but which will positively close when the cap is tilted to an angle of, for example, 15 degrees or more from that position, and which will remain closed during tilting of the cap through all positions other than the normal horizontal position thereof in a substantially horizontal plane and with the container engaging portion downwardly.

Another object resides in the provision of a fluid operable tip-over valve, the major portion thereof forming an integral portion of a unitarily molded closure cap for a fluid containing receptacle.

Still another object is to provide a closure cap with a combined tip-over valve and pressure compensating diaphragm.

Another object is generally to improve and simplify the construction and operation of fluid control gravity operable tip-over valves for one or more of the above objects with specific reference to the closure cap valves employed in airplane hydraulic control systems reserve supply containers for the purpose of maintaining atmospheric pressure within the container during substantially level flight and preventing fluid loss therefrom during non-level flight.

Figure 1:
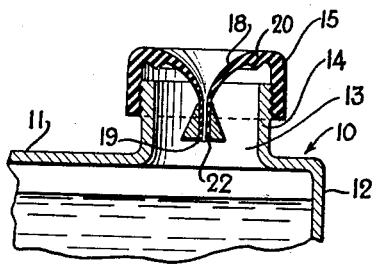
Fig. 1 is a fragmentary view in section showing a liquid container having a closure cap provided with the improved valve in open position to allow fluid communication between the interior and exterior of the container.

The several views illustrate in section container 10 having a top wall 11 and a sidewall 12, top wall 11 being provided with a fluid transfer port 13 formed therein by an upstanding annular neck 14 which may be struck from the upper wall, neck 14 being provided with a threaded upper margin to receive a complementarily threaded cup-shaped closure cap 15. Cap 15 may be made of soft rubber, the angular flange thereof preferably being normally somewhat lesser in diameter than is neck 14, the cap being stretched over the neck to securely engage the threaded container portion under inherent contractile bias. The end wall of cap 15 has a conically depending central portion 18 leading into a tubular end portion 19, the walls, conical portion, and tubular portion being preferably integrally formed of soft rubber. Conical portion 18 carries an annular rib 20 adjacent its base to provide reenforcing means through that area.

Tube portion 19 of the closure cap carries peripherally applied weight 22 which is preferably frustro-conical in form and provided with a center bore to receive the tubular cap portion. Weight 22 is permanently bonded to tubular portion 19 such, for example, as by being vulcanized thereto or being adhered by a suitable adhesive. Weight 22 is of metal, preferably lead, and is mounted on tube 19, large end downward.

As shown in Fig. 1, the valve is adapted to remain open with tube 19 in a substantially vertical position when the container to which the cap and valve is attached is in its normal horizontal position.

Figure 2:
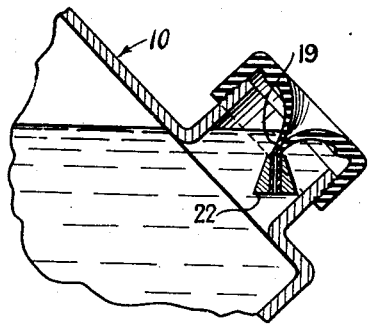
Fig. 2 shows in fragmentary section the device of Fig. 1 tilted at an angle of approximately 45 degrees with the valve closed.

Fig. 2 illustrates container 10 tilted diagonally at approximately 45 degrees from normal. In this position, weight 22 causes tube 19 to flex at a point adjacent the weight, said flexing being sufficient to constrict the tube passage to prevent fluid flow therethrough. It is, however, not necessary to tilt the device to which the valve is attached as much as 45 degrees to obtain this result, it being found that in actual practice, positive closure of the tube passage is attained when the device is tilted approximately 15 degrees.

Figure 3:
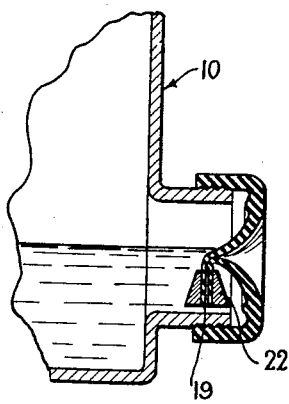
Fig. 3 illustrates in fragmentary section the container tilted 90 degrees from normal with the valve closed.

Fig. 3 illustrates container 10 tilted 90 degrees from normal at which position weight 22 flexes tube 19 to a position substantially right angular with the axis of the conical end wall portion to prevent fluid from escaping through the valve.

Figure 4:
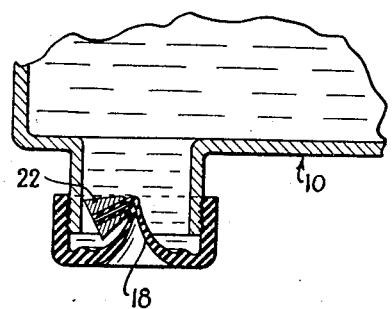
Fig. 4 illustrates in fragmentary section the device tipped 180 degrees from normal with the valve closed.

Fig. 4 illustrates container 10 inverted or at 180 degrees from normal with weight 22 diagonally disposed downwardly in respect to the axis of conical closure wall 18, the passage of tube 19 being of course closed.

Diaphragm 18 serves the duo-function of defining a fluid transfer passage and providing the container to which it is attached with resilient means for the compensation of small pressure differentials within the container during periods when the tip-over valve is closed, since the diaphragm is readily distortable outwardly when the container pressure exceeds atmospheric.

While the improved valve constituting the present invention has been shown in integral association with a closure cap, the valve may, if desired, be mounted directly to a container wall, or incorporated in many other structures without departing from the spirit and scope of the present invention. There are of course numerous ways of building the valve, and also for building the integral cap and valve shown. While the device has worked well with the cap and valve portions of soft rubber throughout, if desired, the device may be made of two or more kinds of rubber vulcanized together, for example, hard rubber being used throughout the threaded flange, soft rubber being used throughout the conical end wall and the weight-carrying tube. If desired, conical portion 18 may be of hard rubber or even of metal, tube 19 being secured thereto in accordance with the teachings of this invention.

What is claimed is:

1. A valve of the class described comprising an internally threaded cap portion, said cap portion merging into a conical flexible depending central portion, said central portion in turn merging into a further depending tubular portion, said tubular portion extending through and being attached to a weight, the threaded portion of said cap being adapted to fit over and cooperate with outside threads on an annular outwardly projecting fluid transfer port neck of a container, the depending portions of the valve being adapted to extend into said container, said central portion being adapted to be retracted under internal pressure within the container whereby additional volume within the container is provided thereby regulating, to a limited degree, the amount of internal pressure which can be built up in said container, said weighted tubular portion being adapted to fall sidewise when turned to a horizontal or upsidedown position, thereby closing the valve.

2. A valve of the class described comprising a cap portion, said cap portion merging into a conical flexible depending central portion, said central portion in turn merging into a further depending tubular portion, said tubular portion having attached thereto a weight, said cap being adapted to fit over and cooperate with an annular outwardly projecting fluid transfer port neck of a container.

BYRON H. SHINN.